United States Patent

Clemence et al.

[11] 3,925,399
[45] Dec. 9, 1975

[54] BASIC ALUMINUM SALT OF 2-N-PROPYL-5-THIAZOLE-CARBOXYLIC ACID

[75] Inventors: Francois Clemence, Rosny-sous-Bois; Odile Le Martret, Paris, both of France

[73] Assignee: Roussel-UCLAF, Paris, France

[22] Filed: Apr. 29, 1974

[21] Appl. No.: 465,188

[30] Foreign Application Priority Data
Mar. 26, 1974 France............................ 74.10277

[52] U.S. Cl............. 260/299; 260/302 R; 424/270
[51] Int. Cl.² ............. C07D 277/56; A61K 31/425; C07F 5/06
[58] Field of Search ...................... 260/299, 448 R

[56] References Cited
UNITED STATES PATENTS
2,844,551   7/1958   Orthner et al. ............... 260/299 X
3,746,700   7/1973   Parisi et al. ...................... 260/299
3,764,618   10/1973  Bonati............................ 260/448 R

*Primary Examiner*—Donald G. Daus
*Assistant Examiner*—Diana G. Rivers
*Attorney, Agent, or Firm*—Hammond & Littell

[57]   ABSTRACT

The basic aluminum salt of 2-n-propyl-5-thiazolecarboxylic acid having the formula

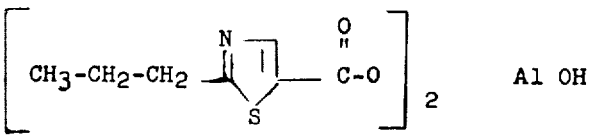

its preparation, hypolipemiant compositions containing the same and therapeutic methods to treat hyperlipemia utilizing the hypolipemiant compositions.

1 Claim, No Drawings

BASIC ALUMINUM SALT OF 2-N-PROPYL-5-THIAZOLE-CARBOXYLIC ACID

OBJECTS OF THE INVENTION

It is an object of the present invention to provide the basic aluminum salt of 2-n-propyl-5-thiazole-carboxylic acid of the above formula.

It is another object of the invention to provide a process for the preparation of the basic aluminum salt of 2-n-propyl-5-thiazole-carboxylic acid of the above formula.

It is a further object of the invention to provide novel hypolipemiant compositions containing the basic aluminum salt of 2-n-propyl-5-thiazole-carboxylic acid of the above formula.

It is a yet further object of the invention to provide a method of reducing the amount of sanguine lipids in warm-blooded animals by the administration of a safe but effective amount of the basic aluminum salt of 2-n-propyl-5-thiazole-carboxylic acid of the above formula.

These and other objects of the present invention will become more apparent as the description thereof proceeds.

DESCRIPTION OF THE INVENTION

The above objects have been achieved by the present invention, a basic aluminum salt of 2-n-propyl-5-thiazole-carboxylic acid having the formula

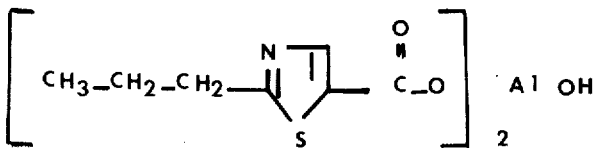

The above basic aluminum salt is prepared by reacting 2-n-propyl-5-thiazole-carboxylic acid with aluminum hydroxide or aluminum isopropylate and recovering the desired product. Preferably aluminum isopropylate is utilized. For example, 2-n-propyl-5-thiazole-carboxylic acid is reacted with aluminum isopropylate in the presence of an aqueous water-miscible organic solvent media such as an aqueous ethanol media. Also, however, 2-n-propyl-5-thiazole-carboxylic acid is reacted with aluminum isopropylate in the presence of an anhydrous water-miscible organic solvent such as dimethylsulfoxide and the product thus obtained is subjected to a treatment with water in order to obtain the basic aluminum salt of 2-n-propyl-5-thiazole-carboxylic acid.

The starting 2-n-propyl-5-thiazole-carboxylic acid is prepared by reacting an alkylthioamide, of formula

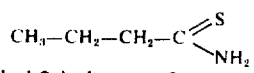

with a lower alkyl 2-halogeno-3-oxo-propionate of formula

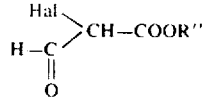

wherein Hal is a halogen atom other than fluorine and R'' is a lower alkyl radical, such as ethyl, saponifying or hydrolyzing the resultant lower alkyl ester of 2-n-propyl-5-thiazole-carboxylic acid to form the desired 2-n-propyl-5-thiazole-carboxylic acid.

Preferably the alkyl 2-halogeno-3-oxo-propionate is ethyl-2-chloro-3-oxo-propionate; the condensation between the alkylthioamide and the alkyl 2-halogeno-3-oxo-propionate is effected in an organic solvent, such as an aromatic or cyclic hydrocarbon or an alkanol, the condensation between the alkyl thioamide and the alkyl 2-halogeno-3-oxo-propionate is effected at reflux of the solvent and the saponification of the alkyl ester of 2-n-propyl-5-thiazole-carboxylic acid is effected by an alkaline agent such as an alkali metal hydroxide in a lower alkanolic solvent.

The basic aluminum salt of 2-n-propyl-5-thiazole-carboxylic acid of the present invention possesses interesting pharmacological properties. It possesses particularly a remarkable hypolipemiant activity. It can thus be utilized, for example, in the treatment of acute or chronic hyperlipemia, of hepatic or toxic steatosis, of lipid nephrosis and the compound of the invention can be prepared as a pharmaceutical composition.

The pharmaceutical compositions of the invention, particularly hypolipemiant compositions, are comprised of the basic aluminum salt of 2-n-propyl-5-thiazole-carboxylic acid, as active principle, and a major amount of a pharmaceutical carrier. The compositions may be in the form of solutes, tablets, coated tablets, cachets, capsules, granules, emulsions, syrups and suppositories prepared in the usual manner. These pharmaceutical compositions may be administered orally or rectally.

The dosology varies as a function of the therapeutic effect desired. For example, in the adult, it can vary from 0.25 gm to 2.5 gm of active principle per day. This corresponds to 5 mg/kg to 100 mg/kg, depending on the method of administration.

The invention, therefore, also relates to a method of reducing the amount of sanguine lipids in warm-blooded animals comprising administering to warm-blooded animals a safe and effective amount of the basic aluminum salt of 2-n-propyl-5-thiazole-carboxylic acid.

In the following examples, there are described several preferred embodiments to illustrate the invention. However, it should be understood that the invention is not intended to be limited to the specific embodiments.

EXAMPLE 1

2-n-propyl-5-thiazole-carboxylic acid

A solution of 30 gm of thiobutyramide in 100 cc of ethanol was mixed with a solution of 36.5 gm of ethyl 2-chloro-3-oxo-propionate in 50 cc of ethanol. The reaction mixture was left in contact overnight, then the alcohol was evaporated off. The residue was dissolved in ether, the ethereal phase was washed with an aqueous 20% sodium carbonate solution, then with water. The oil obtained was distilled and the fraction coming off at about 80°C to 90°C under a pressure of 0.5 mm was recovered. This fraction was saponified with an alcoholic solution of potassium hydroxide, then acidified and recrystallized from toluene. 2-n-propyl-5- thiazolecarboxylic acid was obtained in the form of colorless crystals, soluble in sodium hydroxide and alcohol, slightly soluble in ether, insoluble in water, melting at 137°C.

Analysis: $C_7H_9NO_2S$ = 171.22. Calculated: C% 49.10, H% 5.30, N% 8.18, S% 18.73. Found 49.0, 5.1, 8.0, 18.6.

I.R.Spectrum — KBr:
Bands at 3,115, 2,480, 1,850, 1,700, 1,280, 1,150, 745 and 480$^{cm-1}$
U.V. Spectrum — Ethanol:
Max at 253 mμ

The ethyl 2-chloro-3-oxo-propionate is obtained according to the process described by Elina, Majidson, C.A. 45, 9531e.

EXAMPLE 2

Basic Aluminum salt of
2-n-propyl-5-thiazole-carboxylic acid

A mixture of 10.2 gm of 2-n-propyl-5-thiazole-carboxylic acid and 4.1 gm of aluminum isopropylate in 100 cc of 95% ethanol were heated to reflux under agitation. The reflux was maintained for 18 hours, then the mixture was cooled. The reaction mixture was concentrated under reduced pressure. A white solid was obtained which was just dissolved in methylene chloride. The solution thus obtained was diluted with 600 cc of ether. This solution was cooled to 0°C for 24 hours and next maintained at room temperature for 24 hours. The precipitate was vacuum filtered and, after drying, 5.9 gm of the basic aluminum salt of 2-n-propyl-5-thiazole-carboxylic acid was obtained.

Analysis: $(C_{14}H_{17}N_2O_5S_2Al)$. Calculated: C% 43.74, H% 4.46, N% 7.29, S% 16.68. Found: 43.7, 4.4, 6.9, 16.7.

EXAMPLE 3

Basic aluminum salt of
2-n-propyl-5-thiazole-carboxylic acid.

A mixtue of 5.1 gm of 2-n-propyl-5-thiazole-carboxylic acid, 2 gm of aluminum isopropylate and 15 cc of dimethylsulfoxide were maintained at 60°C for 5 hours. The solution obtained was allowed to stand at rest for 48 hours. Then, it was poured into 200 cc of water. The precipitate formed was filtered, washed and dried. The basic aluminum salt of 2-n-propyl-5-thiazole-carboxylic acid was thus obtained.

Analysis: $(C_{14}H_{17}N_2O_5S_2Al)$. Calculated: C% 43.74, H% 4.46, N% 7.29, S% 16.68. Found: 43.6, 4.4, 7.1, 16.6.

EXAMPLE 4

Pharmaceutical Compositions

Tablets corresponding to the following recipe were prepared:
The basic aluminum salt of 2-n-propyl-5-thiazolecarboxylic acid - 500 mg
Excipient sufficient for a 750 mg tablet.

The excipient contained lactose, starch, talc and magnesium stearate.

EXAMPLE 5

Pharmacological Data

The basic aluminum salt of 2-n-propyl-5-thiazolecarboxylic acid.
1. Determination of the acute toxicity:
The acute toxicity was determined on batches of ten mice weighing from 18 to 22 gm. The product was administered in suspension of 0.25% carboxymethylcellulose + "Tween" in water, at increasing doses, by the intraperitoneal method.
The animals were kept under observation for 48 hours. The average lethal dose ($LD_{50}$) was determined graphically by the method of Miller and Tainter. The $LD_{50}$ by intraperitoneal administration was found to be over 1000 mg/kg.
2. Determination of the hypolipemiant activity:
Determination of plasmatic free fatty acids:
Male rats of the Sprague Dawley S.P.E. strain, weighing from 180 to 200 gms and starved for 24 hours, received the product by oral administration. One hour after the administration, the animals were sacrificed and the determination of the free fatty acids were made on the withdrawn blood obtained.
The extraction of the free fatty acids was made by a modified Dole technique (J. Lipid. Res. 1960, 1, 199-202). The plasmatic extract, freed of phospholipids, was checked colorimetrically by the automatic technique of Antonis (J. Lipid Res. 1965, 6, 307-312).
The following results were obtained:

| Dose mg/kg | % diminution over the controls |
|---|---|
| 5 | 50% |

Conclusion: The activity of the product on the sanguine lipids is very clear.

The preceding specific embodiments are illustrative of the practice of the invention. It is to be understood, however, that other expedients known to those skilled in the art, or disclosed herein, may be employed without departing from the spirit of the invention or the scope of the appended claims.

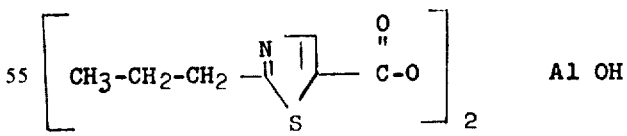

We claim:
1. The basic aluminum salt of 2-n-propyl-5-thiazole-carboxylic acid having the formula